United States Patent
Bose et al.

(10) Patent No.: US 8,483,087 B2
(45) Date of Patent: *Jul. 9, 2013

(54) PORT POOLING

(75) Inventors: Patrick Glen Bose, San Francisco, CA (US); Ky Tong Vong, San Jose, CA (US); Shrikant Jay Vaidya, Rancho Santa Margarita, CA (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/754,489

(22) Filed: Apr. 5, 2010

(65) Prior Publication Data

US 2010/0228840 A1  Sep. 9, 2010

Related U.S. Application Data

(63) Continuation of application No. 11/734,610, filed on Apr. 12, 2007, now Pat. No. 7,706,303.

(60) Provisional application No. 60/805,853, filed on Jun. 26, 2006.

(51) Int. Cl.
*H04L 12/28* (2006.01)
*H04L 12/56* (2006.01)

(52) U.S. Cl.
USPC ............ 370/254; 370/401; 709/220; 709/223

(58) Field of Classification Search
None
See application file for complete search history.

(56) References Cited

U.S. PATENT DOCUMENTS

| | | |
|---|---|---|
| 6,308,315 B1 | 10/2001 | Dice et al. |
| 6,421,711 B1 | 7/2002 | Blumenau et al. |
| 6,499,063 B1 | 12/2002 | Chessell et al. |
| 6,631,395 B1 | 10/2003 | Chessell |
| 6,801,949 B1 * | 10/2004 | Bruck et al. ................... 709/232 |
| 7,069,296 B2 | 6/2006 | Moller et al. |
| 7,076,801 B2 | 7/2006 | Gong et al. |
| 7,111,300 B1 | 9/2006 | Salas et al. |
| 7,213,065 B2 * | 5/2007 | Watt .............................. 709/223 |
| 7,379,990 B2 | 5/2008 | Tsao |
| 7,546,354 B1 | 6/2009 | Fan et al. |
| 7,706,303 B2 | 4/2010 | Bose et al. |
| 7,747,816 B1 | 6/2010 | Nourmohamadian et al. |
| 8,176,153 B2 | 5/2012 | Bose |

(Continued)

OTHER PUBLICATIONS

"U.S. Appl. No. 11/734,610, Non-Final Office Action mailed Jul. 23, 2009", 17 pgs.

(Continued)

*Primary Examiner* — Robert Scheibel
(74) *Attorney, Agent, or Firm* — Schwegman, Lundberg & Woessner, P.A.

(57) ABSTRACT

In one embodiment, methods and systems for port pooling are described. An interface may communicate with at least one physical server. The at least one physical server may host a plurality of virtual servers and be connectable via a plurality of gateway ports to a storage area network (SAN). A virtual server manager configured to arrange the plurality of gateway ports in a plurality of port pools, define a virtual server group including a plurality of virtual servers, associate each virtual server with one or more port pools, the one or more port pools defining available gateway ports for access by the particular virtual server; and provide configuration instructions to allow the particular virtual server to communicate with the SAN through the available gateway ports.

19 Claims, 12 Drawing Sheets

U.S. PATENT DOCUMENTS

| | | | |
|---|---|---|---|
| 2002/0001307 A1 | 1/2002 | Nguyen et al. | |
| 2002/0165961 A1 | 11/2002 | Everdell et al. | |
| 2002/0188870 A1 | 12/2002 | Gong et al. | |
| 2003/0005028 A1 | 1/2003 | Dritschler et al. | |
| 2003/0018927 A1* | 1/2003 | Gadir et al. | 714/4 |
| 2003/0217131 A1 | 11/2003 | Hodge et al. | |
| 2004/0054725 A1 | 3/2004 | Moller et al. | |
| 2004/0236633 A1 | 11/2004 | Knauerhase et al. | |
| 2005/0120160 A1* | 6/2005 | Plouffe et al. | 711/1 |
| 2005/0262505 A1 | 11/2005 | Esfahany et al. | |
| 2006/0041660 A1 | 2/2006 | Bishop et al. | |
| 2006/0107087 A1 | 5/2006 | Sieroka et al. | |
| 2006/0114917 A1* | 6/2006 | Raisch | 370/401 |
| 2006/0143617 A1 | 6/2006 | Knauerhase et al. | |
| 2006/0294516 A1 | 12/2006 | Winner et al. | |
| 2007/0027973 A1* | 2/2007 | Stein et al. | 709/223 |
| 2007/0067435 A1 | 3/2007 | Landis et al. | |
| 2007/0094367 A1 | 4/2007 | Esfahany et al. | |
| 2007/0234334 A1 | 10/2007 | Araujo et al. | |
| 2007/0234337 A1 | 10/2007 | Suzuki et al. | |
| 2007/0250608 A1* | 10/2007 | Watt | 709/222 |
| 2007/0258388 A1 | 11/2007 | Bose | |
| 2007/0283015 A1* | 12/2007 | Jackson et al. | 709/226 |
| 2007/0297428 A1 | 12/2007 | Bose et al. | |
| 2007/0299906 A1 | 12/2007 | Bose et al. | |
| 2009/0282404 A1 | 11/2009 | Khandekar et al. | |

OTHER PUBLICATIONS

"U.S. Appl. No. 11/734,610, Notice of Allowance mailed Dec. 17, 2009", 4 pgs.

"U.S. Appl. No. 11/734,610, Response filed Nov. 16, 2009 to Non Final Office Action mailed Jul. 23, 2009", 13 pgs.

"U.S. Appl. No. 11/743,537, Preliminary Amendment filed Jun. 17, 2008", 7 pgs.

"U.S. Appl. No. 11/692,736, Final Office Action mailed Mar. 28, 2011", 22 pgs.

"U.S. Appl. No. 11/692,736, Response filed Jan. 4, 2011 to Non Final Office Action mailed Aug. 4, 2010", 10 pgs.

"U.S. Appl. No. 11/743,537, Final Office Action mailed Feb. 9, 2011", 16 pgs.

"U.S. Appl. No. 11/743,537, Response filed May 9, 2011 to Final Office Action mailed Feb. 9, 2011", 12 pgs.

"U.S. Appl. No. 11/743,537, Response filed Jun. 23, 2010 to Non Final Office Action mailed Mar. 23, 2010", 13 pgs.

"U.S. Appl. No. 11/743,537, Response filed Dec. 3, 2010 to Non Final Office Action mailed Sep. 3, 2010", 12 pgs.

"U.S. Appl. No. 11/692,736, Examiner Interview Summary mailed Jan. 30, 2012", 3 pgs.

"U.S. Appl. No. 11/692,736, Final Office Action mailed Jun. 21, 2012", 22 pgs.

"U.S. Appl. No. 11/692,736, Non Final Office Action mailed Oct. 12, 2011", 22 pgs.

"U.S. Appl. No. 11/692,736, Response filed Aug. 10, 2011 to Final Office Action mailed Mar. 28, 2011", 10 pgs.

"U.S. Appl. No. 11/743,537, Non Final Office Action mailed Aug. 12, 2011", 13 pgs.

"U.S. Appl. No. 11/743,537, Notice of Allowance mailed Jan. 3, 2012", 13 pgs.

"U.S. Appl. No. 11/743,537, Response filed Nov. 14, 2011 to Non Final Office Action mailed Aug. 12, 2011", 8 pgs.

* cited by examiner

PORT POOLING

PRIORITY CLAIM

This application is a continuation of U.S. application Ser. No. 11/734,610, filed on Apr. 12, 2007 now U.S. Pat. No. 7,706,303, which claims the priority benefit of U.S. Provisional Application No. 60/805,853, filed 26 Jun. 2006, each of which is incorporated herein by reference.

TECHNICAL FIELD

This application relates to data processing systems and networking. More particularly, the present disclosure relates to a method and system for port pooling.

BACKGROUND

The demand on certain physical servers may be greater than others because of actions being performed thereon. Additional physical servers may be added or existing physical servers may be re-assigned to meet demand.

Further, servers may experience excessive demand because of bandwidth limitations for physical server access through gateway ports on a server chassis. When adding new physical servers or re-assigning existing physical servers to meet demand, an administrator may modify a mapping of the gateway ports to the physical servers to provide sufficient bandwidth, and/or may add additional gateway ports to provide additional bandwidth. The administrator may then manually reconfigure or re-initialize the virtual servers to use the modified gateway port allocation. The administrator may seek to implement the changes at off-periods as the virtual servers may be unavailable for a period of time during reconfiguration or re-initialization.

BRIEF DESCRIPTION OF DRAWINGS

The particular embodiments of the invention are illustrated by way of example, and not limitation, in the figures of the accompanying drawings, in which like reference numerals indicate the same or similar features unless otherwise indicated.

In the drawings.

OVERVIEW

Methods and systems for port pooling are described. An interface may communicate with at least one physical server. The at least one physical server may host a plurality of virtual servers and be connectable via a plurality of gateway ports to a storage area network (SAN). A virtual server manager configured to arrange the plurality of gateway ports in a plurality of port pools, define a virtual server group including a plurality of virtual servers, associate each virtual server with one or more port pools, the one or more port pools defining available gateway ports for access by the particular virtual server; and provide configuration instructions to allow the particular virtual server to communicate with the SAN through the available gateway ports.

DESCRIPTION OF EXAMPLE EMBODIMENTS

In the following detailed description, reference is made to the accompanying drawings that form a part hereof, and in which are shown by way of illustration, specific embodiments in which the disclosed subject matter can be practiced. It is to be understood that other embodiments may be utilized and structural changes may be made without departing from the scope of the disclosed subject matter.

As described further below, according to various example embodiments of the disclosed subject matter described herein, there is provided methods and systems for port pooling. The system may include a computer program embedded within the memory and executable by the processor, the computer program comprising instructions to implement a port pooling system.

In a virtual server system that includes physical servers connected through a gateway to Storage Area Networks (SANs), port pools may be defined on the gateway by selecting a plurality of gateway ports. A number of the gateway ports in the port pools may be made available to a virtual server group. A virtual server may be then be defined within the virtual server group and World Wide Port Names (WWPNs) for the virtual server may be bound to the ports pools to provide the virtual server with an appropriate amount of bandwidth and to enable the virtual server to dynamically use a modified gateway port mapping.

Figure 1:
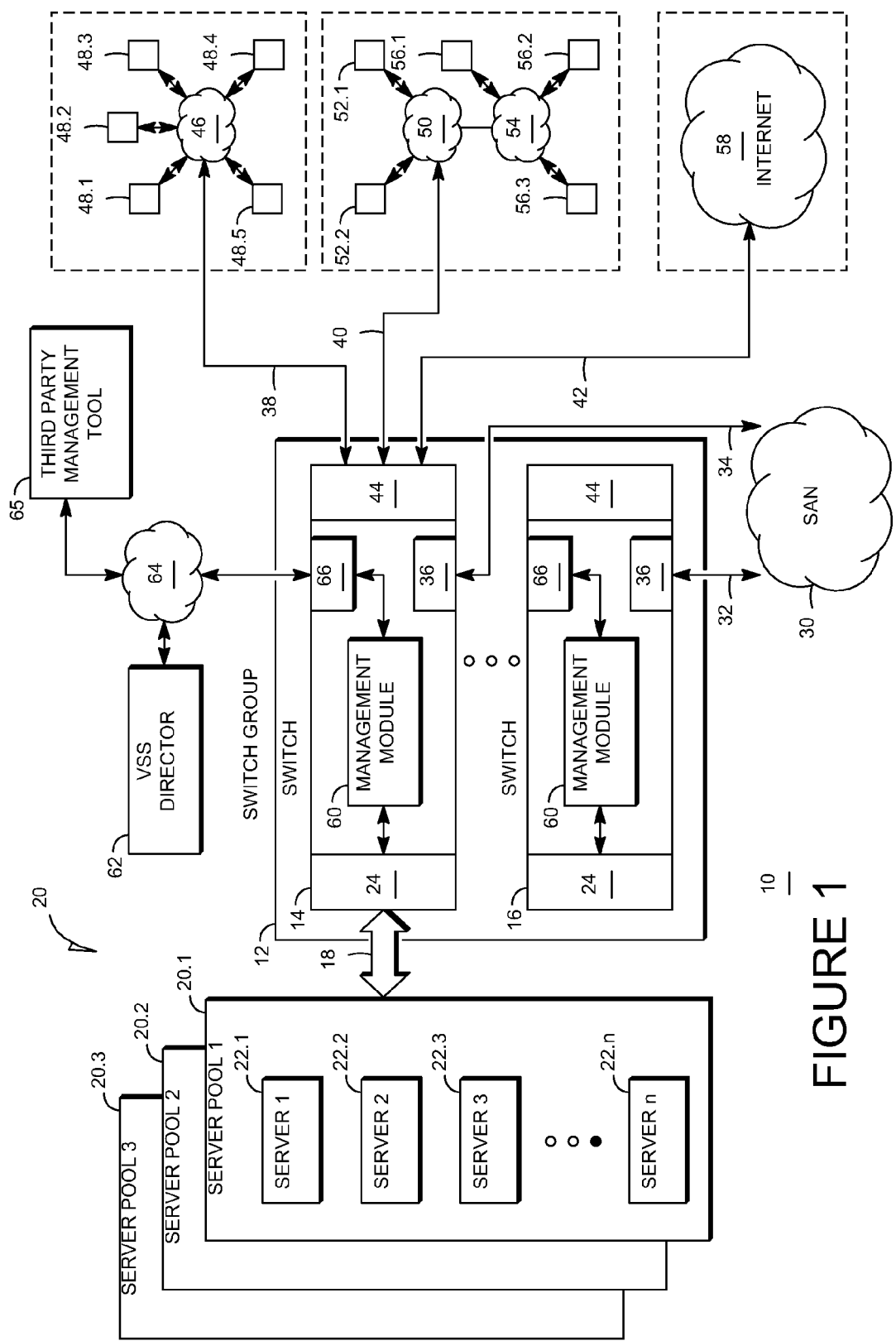
FIG. 1 is a block diagram of example architecture of a virtual server system.

FIG. 1 generally illustrates a virtual server system 10 (herein referred to by way of example as a "VSS") with associated hardware on which one or more virtual servers are deployed. The virtual server system 10 allows server personalities to be assigned to generic static servers over a server fabric switch, however server personalities may also be assigned to other servers. The virtual server system 10 may be a VFRAME system available from Cisco Systems Inc., or any other virtual server system.

In an example embodiment, as the server personality is disembodied or separated from the physical structure, it may be possible to provision virtual servers on-demand out of industry standard components to enable differing configurations of virtual servers without reconfiguring the server. Each virtual server deployed on a physical server defines a state of a physical server. This may include the logical definitions and configuration information stored in, and used by, a VSS director (described by way of example in more detail below) to program a server fabric, an Operating System (OS), and applications of the virtual server. The state may be stored on a logical unit on a SAN 30, as described in more detail below. Thus, in FIG. 1, the example physical servers 22.1-22.$n$ are the physical devices on which one or more virtual servers run. These physical servers include a CPU, memory, IO devices, and the like.

The system 10 is shown, by way of example, to include a switch group 12 including one or more switches 14, 16. The switch group 12 is connected, for example, via an InfiniBand link 18 (e.g., a switched fabric communications link) to one or more server pools 20. Each server pool 20.1-20.3 is shown to include a plurality of physical servers 22.1-22.$n$ linked via one or more InfiniBand links 18 to the switch group 12. By way of example, three physical server pools 20.1-20.3 (on which the virtual servers are deployed) are shown in FIG. 1 but any number of server pools may be provided. Each server pool may have a different number of servers.

When the link 18 is an InfiniBand link, each switch 14 may include an InfiniBand interface 24 to interface the server pools 20.1-20.3 to the switch group 12. The InfiniBand architecture or link may define a high speed network for interconnecting processing nodes and I/O nodes. In an InfiniBand network, processing nodes and I/O nodes are connected to the fabric by Host Channel Adapters (HCAs) and Target Channel Adapters (TCAs). Other links may be provided in addition to, or instead of, the InfiniBand link 18.

Figure 2:
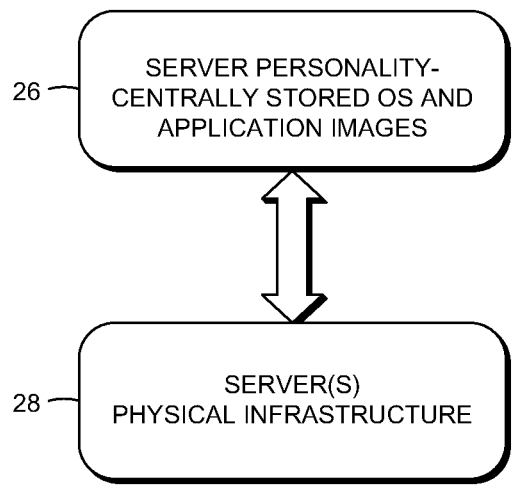
FIG. 2 is a block diagram showing separation of the physical infrastructure from the server personality of a server of the system of FIG. 1.

FIG. 2 shows the personality of each server 22.1-22.$n$ disembodied or separated from the physical servers or infrastructure (see blocks 26 and 28 in FIG. 2). The server personality may describe the function or configuration of the virtual server. For example, the personality of the servers 22.1-22.$n$ (e.g., the OS, application image(s), or the like may be stored remotely from the physical server infrastructure on the SAN 30 (see FIG. 1)).

In this example embodiment, the physical server infrastructure may be stateless computational resources with CPUs and memory. For example, as shown in FIG. 1, the SAN 30 (including one or more databases) may be provided to operate in conjunction with the physical servers 22.1-22.$n$. It will be appreciated that the SAN 30 may be a distributed data facility dispersed geographically. In an example embodiment, the SAN 30 may be connected to the example switches 14, 16 via fibre channel connections 32, 34. Accordingly, each switch 14, 16 may include a fibre channel gateway 36. In other embodiments, the switches 14, 16 may communicate with the SAN 30 via other channels in addition to, or instead of, the fibre channel gateway 36. The personalities or state of the virtual servers may be stored in a local database or on the SAN 30.

The switch 14 communicates with a plurality of different networks (Local Area Networks, Wide Area Networks, or the like) via communication links 38, 40, 42. For example, the communication links 38, 40, 42 may be Ethernet connections and, each switch 14, 16 may include one or more Ethernet gateways 44. In the example system 10, the communication link 38 is shown to connect to a network 46 interconnecting a plurality of hosts 48.1-48.5. The hosts 48.1-48.5 may form part of another data network, or be any other network host.

The switch 14 also communicates via the communication link 40 to a network 50 which may, for example, be an enterprise network. The network 50 communicates with desktop computers 52.1-52.2 and a subnet 54 which, in turn, is connected to desktop computers 56.1-56.3. Further, the switch 14 connects via the communication link 42 to a network such as the Internet 58. The aforementioned networks are merely example networks and different configurations, and different numbers of networks and subnets may be provided that connect a wide range of network devices.

The system 10 may allow virtualization of servers deployed on physical servers to be managed by a management module 60. The management module 60 may be provided at the switch 14 or in other components. The management module 60 communicates with a VSS director 62 that controls the provisioning of the server pools 20.1-20.3.

In an example embodiment, the VSS director 62 communicates via a network 64 with the management module 60. The system 10 also includes a third party management module 65 that communicates with the VSS director 62 and/or with the management module 60 to manage the provisioning of virtual servers. In an example embodiment, the network 64 is an Ethernet network and, accordingly, the switch 14 may thus include one or more Ethernet ports 66. However, the various communication links linking the various components/devices in the system 10 are not restricted to InfiniBand connections, Ethernet connections, or the like. Any communication means may be provided to interconnect the various components.

Figure 3:
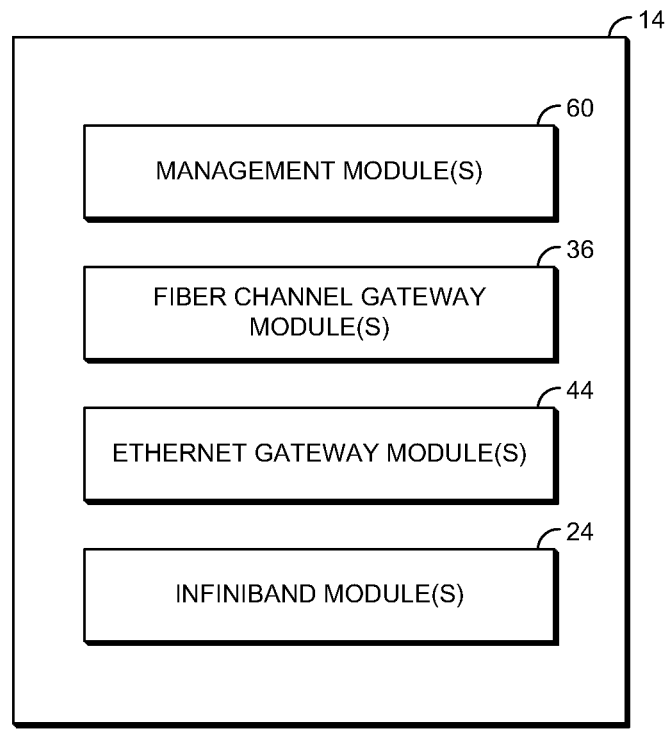
FIG. 3 is a block diagram of an example switch deployed in the system.

FIG. 3 shows example modules of the switch 14. The switch 14 may include one or more management modules 60, one or more fibre channel gateway modules 36, one or more Ethernet gateway modules 44, and one or more InfiniBand modules 24. The modules 60, 36, 44, and 24 may include various electronic components to effect communication using the relevant protocols. In an example embodiment, the VSS director 62 of the system 10 allows software partners to program the switches 14, 16 with policies necessary to implement virtual servers on demand. For example, the third party management tool 65 may be used to accomplish this.

Figure 4:
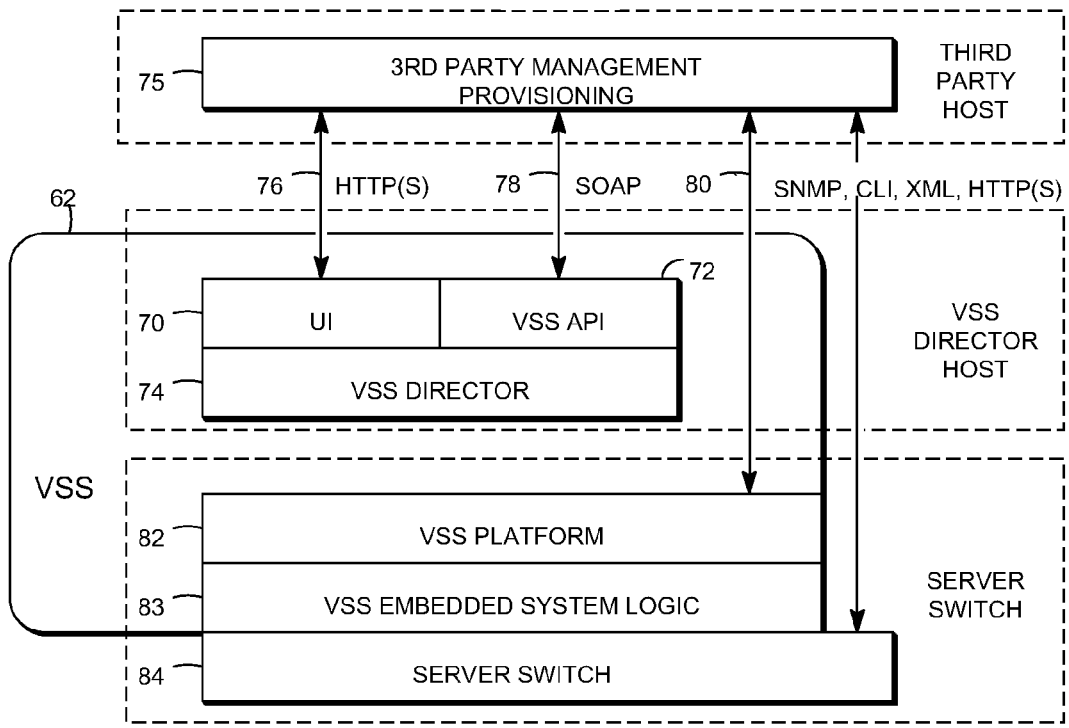
FIG. 4 is a block diagram of example software architecture of a management module communicating with a third party management tool.

As shown by way of example in FIG. 4, the VSS director 62 (which may reside on a separate server) may logically include a user interface module 70, a VSS director Application Program Interface (API) 72 and a VSS director platform 74. The VSS director 62 may communicate with a third party management and provisioning module 75 (e.g., may correspond to the third party management tool 65 in FIG. 1) via, for example, the network 64. In an example embodiment, the user interface module 70 communicates with the third party management and provisioning module 75 via an HTTP(s) link 76, a SOAP link 78, or the like. The third party management and provisioning module 75 may also communicate via link 80 to a VSS platform 82. The server switch 14 also may include embedded system logic 83 provided at a switch 84 (e.g., a switch 14, 16).

Figure 5:
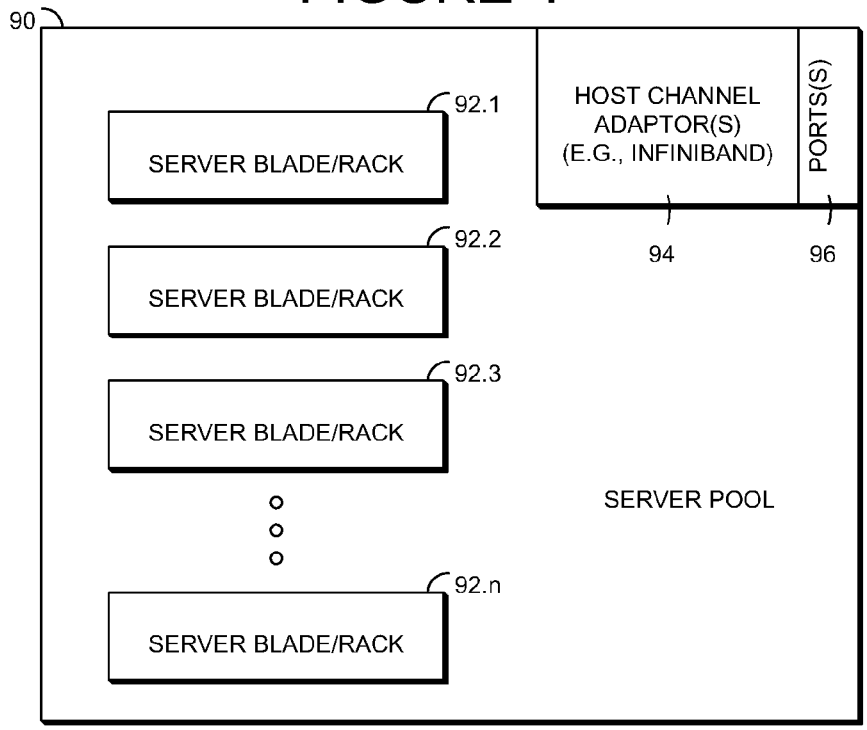
FIG. 5 is a block diagram of an example physical server pool of the system of FIG. 1.

FIG. 5 shows an example physical server pool 90. The server pool 90 is shown to include a plurality of physical servers (e.g., server blades) 92.1-92.$n$. Each of the servers 92.1-92.$n$ may host one or more virtual servers. The servers 92.1-92.$n$ may correspond to the servers 22.1-22.$n$ in FIG. 1. In an example embodiment, in order to communicate via the communication link 18, each server pool 90 includes one or more host channel adapters (HCA) 94 (e.g., one or two HCAs per physical server) when deployed in an InfiniBand environment. However, other adapters and configurations may be used in different environments. Further, one or more ports 96 may be provided for communication via further communication protocols or channels. As mentioned above, the servers 92.1-92.n are physical servers. The virtual servers hosted on the physical servers may be defined by network configuration and/or logical definitions stored in a database of the VSS director 62 and by a server state which is stored on networked storage.

Figure 6:
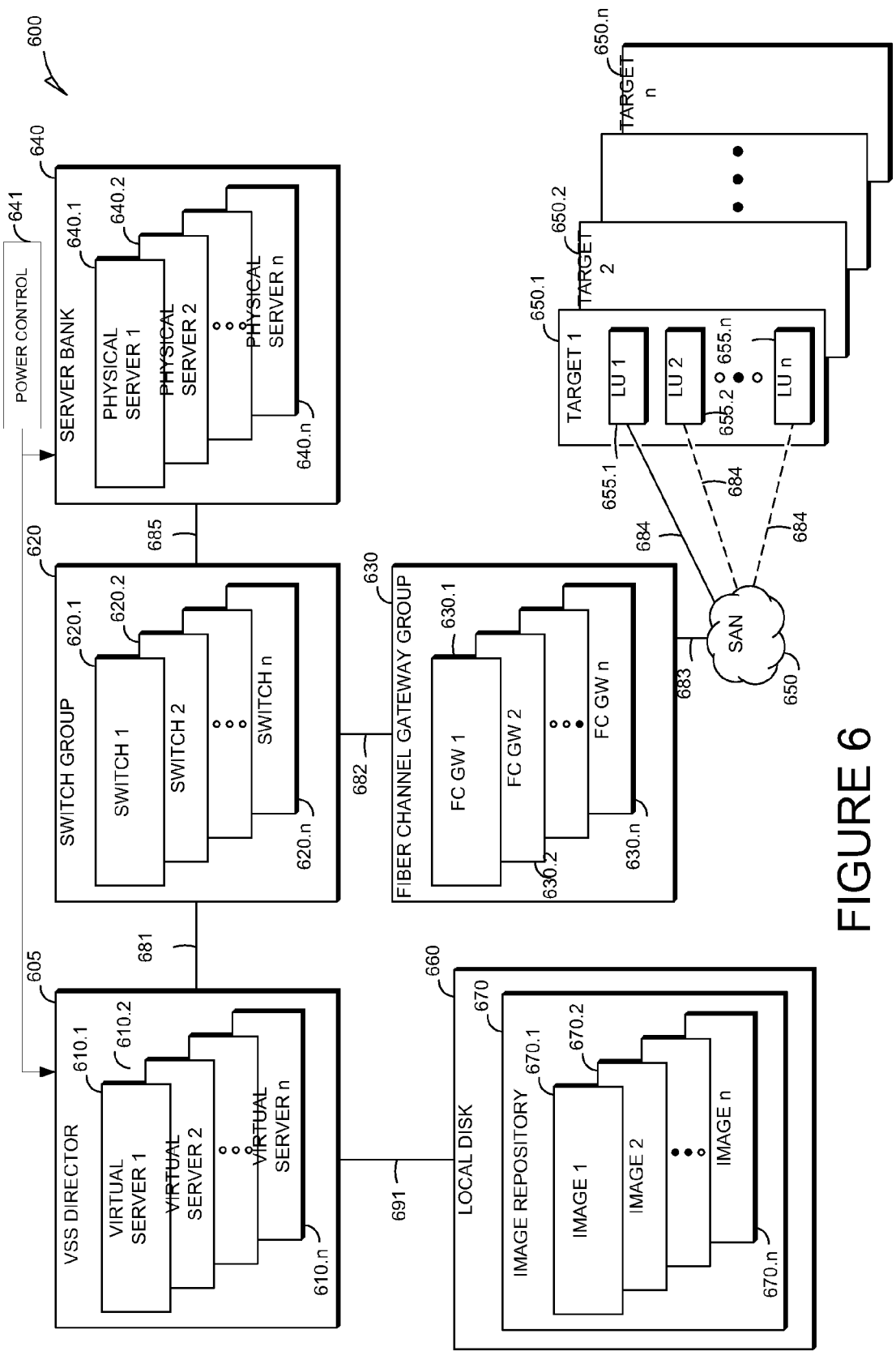
FIG. 6 is a block diagram of an example virtual server system.

FIG. 6 shows an example virtual server system 600, in accordance with an example embodiment, to manage and provision (e.g., clone) a server configuration. Various components of the system 600 may correspond to the virtual server system 10 shown in FIG. 1. For example, the system 600 includes a VSS director 605, which may correspond to the VSS director 62 (see FIG. 1).

A virtual server group 610, which includes one or more virtual servers 610.1-610.n, may be implemented by the VSS director 605. A server bank 640 is provided which may include one or more physical servers 640.1-640.n. The system 600 may also include a SAN 650 including target memory devices 650.1-650.n. Each of the target memory devices 650.1-650.n, such as target memory device 650.1, includes one or more logical units (LUs) 655.1-655.n. In an example embodiment, each LU 655.1-655.n serves as a memory location for a virtual server. A local disk 660 may be a memory device for the VSS director 605, and may have an image repository 670 that includes one or more images 670.1-670.n. The image repository 670 in an example embodiment may be located at another location, such as at the SAN 650. The VSS director 605, the server bank 640, and the SAN 650 can be interconnected through a switch group 620 (which is shown by way of example to include switches 620.1-620.n) and a fibre channel gateway (FC GW) group 630 (which includes FC GWs 630.1-630.n).

Figure 7:
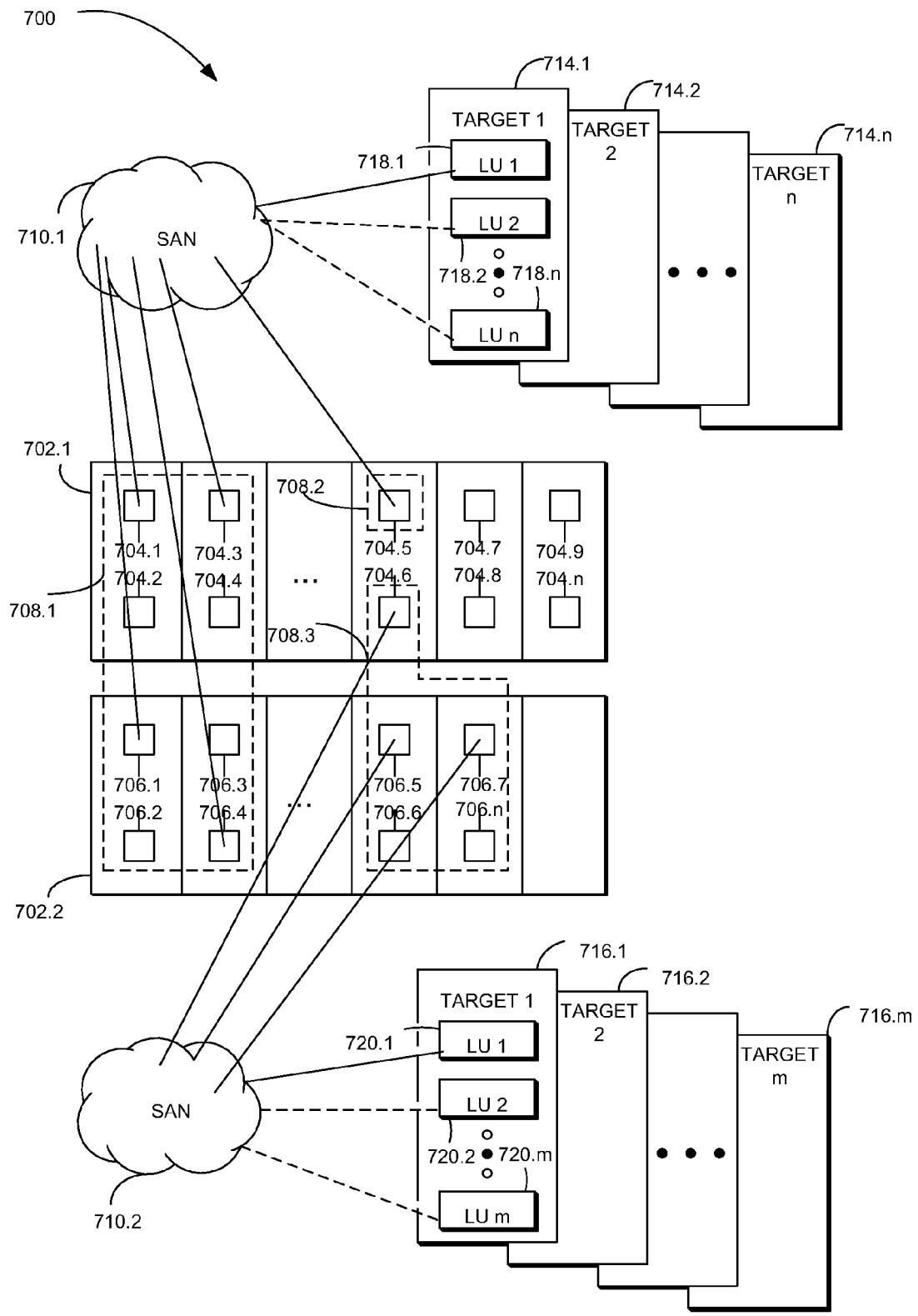
FIG. 7 is a block diagram of an example fibre channel gateway connected to Storage Area Networks (SANs)
Figure 8:
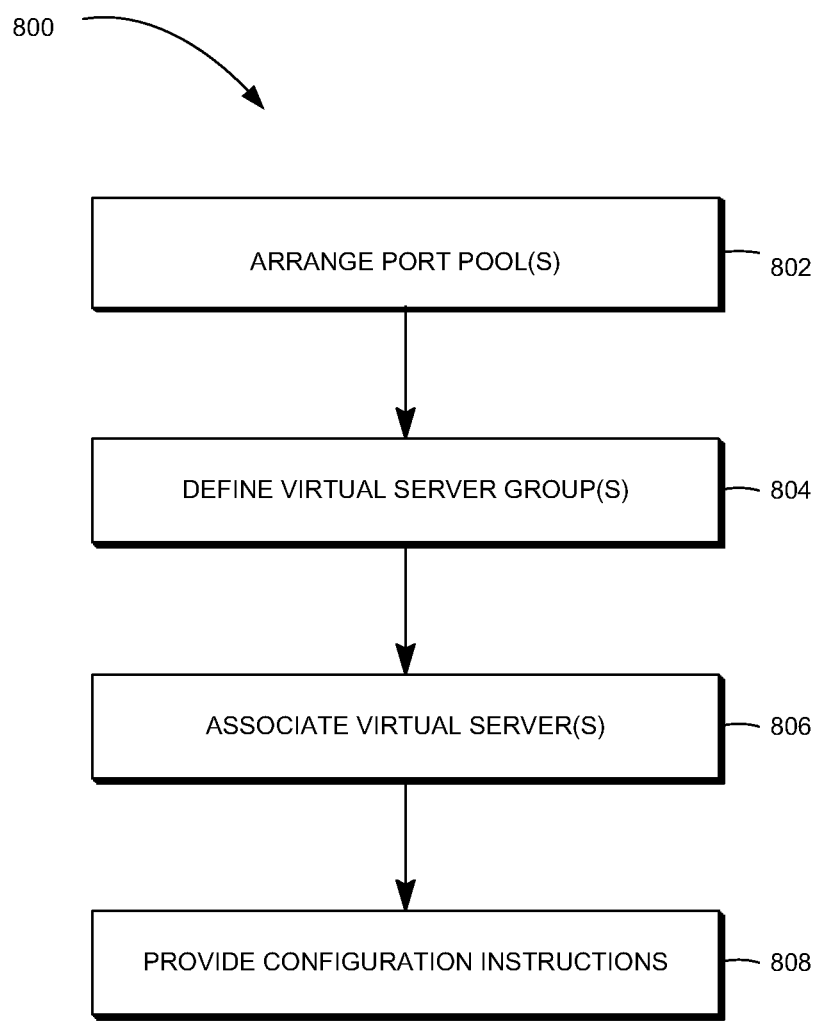
FIG. 8 is a flowchart illustrating a method for provisioning a virtual server according to an example embodiment.

FIG. 7 shows an example system 700 including a number (e.g., one or more) of gateway devices 702.1, 702.2 (e.g., a server chassis) connected to a number of SANs 710.1, 710.2. Various components of the system 700 may correspond to the virtual server systems 100, 600 (see FIGS. 1 and 6). For example, the SANs 710.1, 710.2 may correspond to the SAN 30 and/or the SAN 650 (see FIGS. 1 and 6).

The gateway device 702.1 may include a number (e.g., one or a plurality) of gateway ports 704.1-704.n while the gateway device 702.2 may include a number of gateway ports 706.1-706.n. In an example embodiment, each fibre channel gateway 630.1-630.n (see FIG. 6) may include the gateway devices 702.1, 702.2.

The SANs 710 may include a number of target memory devices 714.1-714.n, 716.1-716.m. In an example embodiment, the use of more than one SAN 710 may enable higher system availability and/or provide a separate storage mechanism. Each of the target memory devices 714.1-714.n, 716.1-716.m, such as the target memory device 714.1, may include a number of logical units (LUs) 718.1-718.n.

The gateway ports 704.1-704.n, 706.1-706.n may be bound to the SANs 710. By way of example, the gateway ports 704.1, 704.3, 706.1, 706.4 may be bound to the SAN 710.1 while the gateway ports 704.6, 706.5, 706.7 may be bound to the SAN 710.2. However, other gateway port-to-SAN configurations may also be used with the system 700.

Each of the SANs 710 may include access controls to enable access to a number of the logical units 718.1-718.n, 720.1-720.n of the target memory devices 714.1-714.n, 716.1-716.m. In an example embodiment, the SAN 650 (see FIG. 6) may include the functionality of the SANs 710, the target memory devices 650.1-650.n may include the functionality of the target memory devices 714.1-714.n, 716.1-716.m, the LU 655.1-655.n may include the functionality of the LUs 718.1-718.n, 720.1-720.m.

The use of a number of port pools 708.1-708.3 for the gateway ports 704.1-704.n, 706.1-706.n is described in greater detail by way of an example below.

FIGS. 8-12 illustrate a method 800 for provisioning a virtual server with a number of port pools 708.1-708.3 (see FIG. 7) in accordance with an example embodiment.

A plurality of gateway ports 704.1-704.n, 706.1-706.n may be arranged in a plurality of port pools 708.1-708.3 at block 802. For example, the port pools 708.1-708.3 may be defined on the gateway device 702.1, 702.2 (see FIG. 7) of a fibre channel gateway 900. In an example embodiment, the fibre channel gateways 630.1-630.n (see FIG. 6) may include the functionality of the fibre channel gateway 900.

Figure 9:
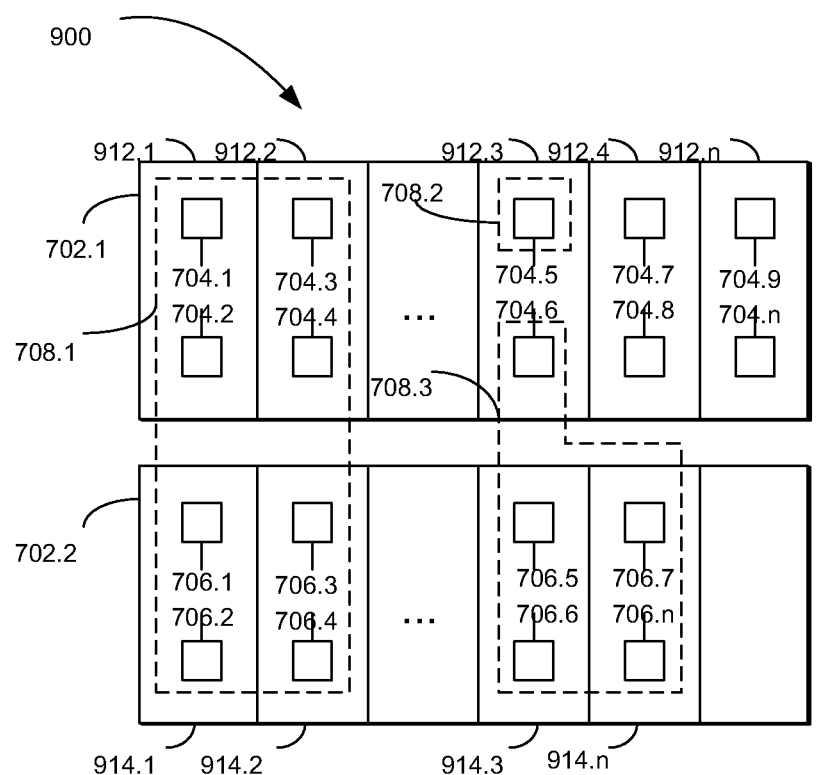
FIG. 9 is a block diagram of an example fibre channel gateway.

As illustrated in FIG. 9, an example implementation of the fibre channel gateway 900 is shown to include the gateway device 702.1, 702.2. Each of the gateway devices 702 may include a number of gateways 912.1-912.n, 914.1-914.n. Each gateway 912, 914 may include a number (e.g., one or a plurality) of the gateway ports 704.1-704.n, 706.1-706.n (see FIG. 7). The number of gateway ports 704, 706 available to the port pools 708.1-708.3 may optionally be increased by adding an additional gateway 912, 914 to the gateways 912.1-912.n, 914.1-914.n.

The port pools 708.1-708.3 may optionally be defined by selecting from among the gateway ports 704.1-704.n, 706.1-706.n to include in each of the port pools 708.1-708.3. For example, a first port pool 708.1 is shown to include eight gateway ports 704.1-704.4, 706.1-706.4, while a second port pool 708.2 is shown to include a gateway port 704.5. A third port pool 708.3 is shown to include gateway ports 704.6, 706.5-706.n.

A gateway port 704, 706 may belong to only one port pool 708 or the gateway port 704, 706 may belong to more than one port pool 708. Each of the gateway ports 704.1-704.n, 706.1-706.n in the one or more port pools 708.1-708.3 may be connected to the same server fabric. Each of the port pools 708.1-708.3 may optionally span more than one fibre channel gateway 900 and/or more than one gateway device 702.

In an example embodiment, the VSS director 62 (see FIG. 1) may define the port pools 708.1-708.3 by grouping and allocating the gateway ports 704.1-704.n, 706.1-706.n into the port pools 708.1-708.3. The gateway ports 704.1-704.n, 706.1-706.n may be pooled by other resources of a server system such as by the management module 60 (see FIG. 1).

The port pools 708.1-708.3 may optionally be limited to the gateway ports 704.1-704.n, 706.1-706.n on the same SAN 710. For example, a dynamic assignment of the gateway ports 704.1-704.n, 706.1-706.n may be enabled by having the gateway ports 704.1-704.n, 706.1-706.n for each of the port pools 708.1-708.3 connected to the same SAN 710.

In an example embodiment, the user may not have to manually rebalance an entire physical server mapping to the gateway ports 704.1-704.n, 706.1-706.n to shift some load to a newly added gateway port 704, 706. For example, the VSS director 62 (see FIG. 1) may perform the rebalancing.

A virtual server group may be defined to include a plurality of virtual servers to be hosted on at least one physical server at block 804. The virtual server group includes a pool listing of a number of gateway ports 704.1-704.n, 706.1-706.n available to the members of the virtual server group from each of the port pools 704.1-704.n.

Figure 10:
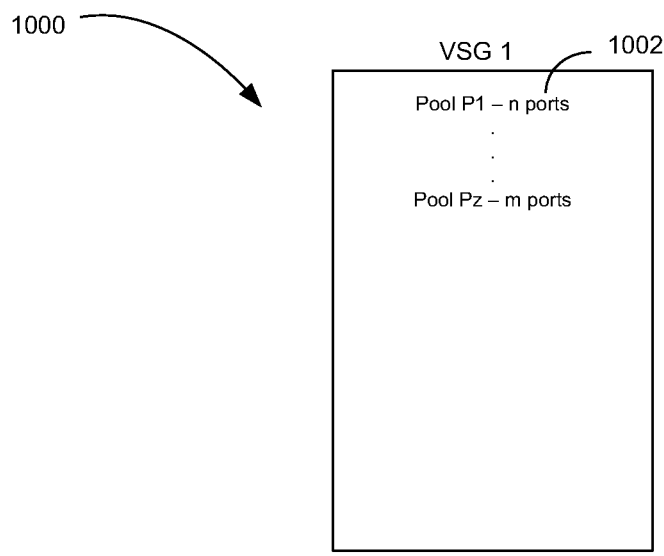
FIG. 10 is a block diagram of an example virtual server group.

As illustrated in FIG. 10, an example embodiment of a virtual server group 1000 may include a port listing 1002 including a pool P1 (e.g., the port pool 708.1) having n ports available and a pool Pz (e.g., the port 708.3) having m ports available. For example, defining the virtual server group 1000 may include generating the port listing 1002 of a number of the gateway ports 704.1-704.$n$, 706.1-706.$n$ from each of the port pools 708.1-708.3 (e.g., as defined on the fibre channel gateway 900 of FIG. 9) that are available to the virtual server group 1000.

The user may optionally define the port pools 708.1-708.3 and select a number of the gateway ports 704.1-704.$n$, 706.1-706.$n$ from among each of the port pools 708.1-708.3 that a virtual server group 1000 can access. Providing the virtual server group 1000 access to the port pools 708.1-708.3 as opposed to selected gateway ports 704.1-704.$n$, 706.1-706.$n$ may reduce configuration work to be performed by a user of the system 10 (see FIG. 1). An example embodiment of a method of designating gateway port availability to the virtual server group 1000 is described in greater detail below.

A number of virtual servers may be defined (e.g., within the virtual server group 1000) during the operations at block 804. For example, defining a virtual server may include generating a World-Wide Node Name (WWNN) with associated World-Wide Port Names (WWPNs) for the virtual server to use when communicating through the gateway ports 704.1-704.$n$, 706.1-706.$n$.

The virtual servers may be associated with one or more ports pools at block 806. The association of the virtual servers with the one or more port pools 708.1-708.3 provides the virtual servers with access to a number of available gateway ports 704.1-704.$n$, 706.1-706.$n$ in one or more of the port pools 708.1-708.3. For example, the VSS director 62 may control an actual mapping of physical and/or virtual servers to the gateway ports 704.1-704.$n$, 706.1-706.$n$ to achieve a desired and/or selected resource allocation of resources of the virtual server system 10 (see FIG. 1). In this way, port pooling may distribute the gateway ports 704.1-704.$n$, 706.1-706.$n$ more equally among the physical servers that host the virtual servers, and may avoid peaks and valleys in port bandwidth as noted in the more general description hereinabove. The VSS director 62 may assign port pools dynamically, as loads may change during operation of the virtual server system 10.

Figure 11:
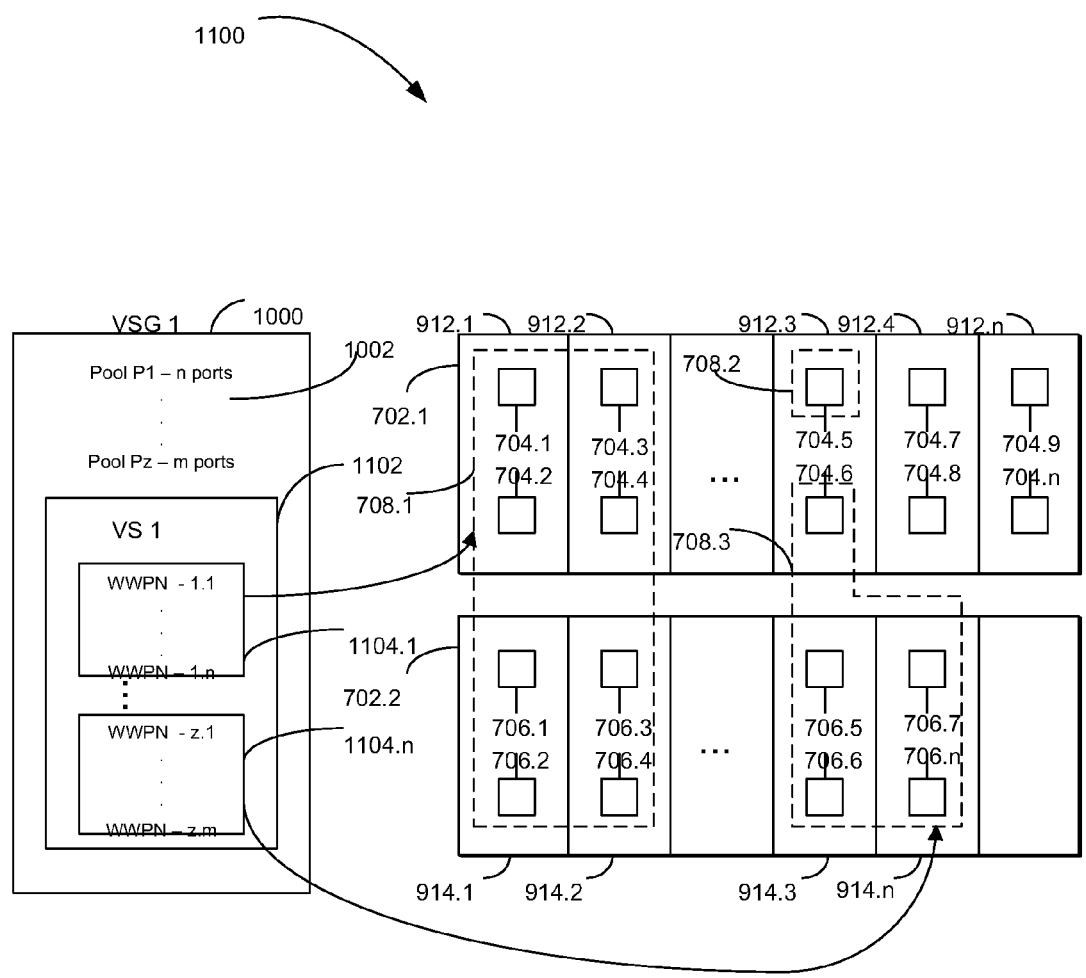
FIG. 11 is a block diagram of an example virtual server.

As illustrated in FIG. 11, an example system 1100 may include a virtual server 1102 defined within the virtual server group 1000. The virtual server 1102 may have WWPNs 1104.1 bound to the port pool 708.1 and WWPNs 1104.2 bound to the port pool 708.3.

Each of the WWPNs 1104.1-1104.$n$ may optionally be bound to the gateway ports 704.1-704.$n$, 706.1-706.$n$ in a selected port pool 708. In an example embodiment, the WWPNs 1104.1-1104.$n$ may be generated for a virtual server-to-gateway port binding. The VSS director 62 may optionally perform a WWPN generation and maintain a WWPN-to-port pool association. A list of the WWPNs 1104 for the virtual servers 1100 may optionally be provided (e.g., by an administrator of the virtual server system 10) to a storage administrator of the SANs 710.1-710.2 after the WWPNs 1104 are generated.

By way of example, if the port listing 1002 of the virtual server group 1000 provides that that each virtual server 1102 in the virtual server group 1000 has access to two gateway ports 704, 706 from a first port pool PP1 and three gateway ports from a second port pool PP2, then, when a virtual server VS1 is defined in the virtual server group 1000, the VSS director 62 (see FIG. 1) may generate two WWPNs 1104 for virtual server VS1 to be bound to ports in port pool PP1 and three WWPNs 1104 for virtual server VS1 to be bound to port pool PP2.

A user may optionally keep track of the port pools 708.1-708.3 to which the WWPNs 1104 are bound to instead of keeping track of an exact gateway port 704, 706 to which the WWPNs 1104 are bound. For example, a user may keep track of only the port pools 708.1-708.3 for a particular SAN 710 to which the WWPNs 1104 are bound to instead of keeping track of the exact gateway port 704, 706 to which the WWPNs 1104 are bound.

The WWPNs 1104 when defining the virtual server 1102 may differ depending on the gateway ports 704.1-704.$n$, 706.1-706.$n$ available in a particular port pool 708 associated with the virtual server group 1000 of the virtual server 1102. For example, if the particular port pool 708 has four gateway ports 704, 706 and the port listing 1002 with the virtual server group 1000 indicates that two of the four gateway ports 704, 706 may be used, any two of the four gateway ports 704, 706 may be used to provide the WWPNs 1104 to the virtual server 1102.

A number of the WWPNs 1104 assigned to the virtual server 1102 may optionally be limited. Limiting the number of the WWPNs 1104 may reduce a configuration time to implement security on the SANs 710.1-710.2 (see FIG. 7). For example, the configuration time to implement security on the SANs 710.1-710.2 may be reduced since when certain WWPNs 1104 appear on a first SAN 710, the certain WWPNs 1104 do not need to be configured on a second SAN 710 (e.g., such as when configuring a zoning for access control on the SANs 710.1-710.2). Where a particular port pool 708 is only associated with a particular SAN 710, any of the WWPNs 1104 that are not in the particular port pool 708 when configuring the particular SAN 710 may be ignored.

A mapping of the gateway ports 704.1-704.$n$, 706.1-706.$n$ may optionally dynamically change as the VSS director 62 (see FIG. 1) selects the gateway ports 704, 706 to map the virtual servers 1102 when the virtual servers 1102 are activated as opposed to a having a fixed mapping of the virtual servers 1102 to the gateway ports 704, 706.

In an example embodiment, each of the WWPNs 1104 may be associated with a particular port pool 708 and may be bound only to the gateway ports 704.1-704.$n$, 706.1-706.$n$ in that particular port pool 708. The WWPNs 1104 may not appear in more than one port pool 708.

In an example embodiment, the WWPNs 1104 associated with each of the port pools 708.1-708.3 may be shown to a user through use of the user interface module 70 (see FIG. 4). The user may use the WWPNs 1104 shown to configure access controls on a particular SAN 710. For example, when two port pools 708 are connected to a same SAN 710, the WWPNs 1104 from the two port pools 708 may be considered during configuration of the same SAN 710.

The virtual server 1102 may have access to the gateway ports 704.1-704.$n$, 706.1-706.$n$ when a WWPN 1104 is bound to a gateway port 704, 706. In an example embodiment, the VSS director 62 may bind the WWPNs 1104 to the gateway ports 704.1-704.$n$, 706.1-706.$n$ for the virtual server 1102.

In an example embodiment, the use of the port pools 708.1-708.3 may enable the VSS director 62 to automatically handle errors as well as load balance connections for the virtual servers 1102 that are live. For example, if a particular gateway port 704, 706 fails, the VSS director 62 may migrate all virtual servers 1102 using that particular gateway port 704, 706 to other gateway ports 704, 706 in a same port pool 708. In this way, the virtual servers 1102 may continue to be provided with an appropriate amount of available port bandwidth.

When new gateway ports 704, 706 are added to a particular port pool 708, the VSS director 62 may, in an example embodiment, dynamically migrate some of the virtual servers 1102 to the new gateway ports 704, 706 to balance a load without waiting for the virtual server 1102 to be re-activated. Dynamically balancing a load through the use of port pools may save processing time and/or operator time that might otherwise be spent re-activating the virtual servers, and may also enable the virtual servers to more quickly use newly available resources without interference with the operation of the virtual servers from shut downs and reactivations.

The VSS director 62 may optionally balance a load across the gateway ports 704.1-704.$n$, 706.1-706.$n$ to provide high availability for the virtual server 1102. For example, an algorithm used by the VSS director 62 for balancing the load may be enhanced to use input from one or more user defined policies.

Returning to FIG. 8, configuration instructions may be provided to allow a particular virtual server to communication with the SAN 710 through the available gateway ports 704.1-704.$n$, 706.1-706.$n$ at block 808.

Upon completion of the operations at block 808, the method 800 may terminate.

In an example embodiment, a physical server 1202 may be assigned to the virtual server 1102 upon completion of the operations at block 808. The VSS director 62 (see FIG. 1) may then select specific gateway ports 704, 706 from each of the port pools 708 to bind each of the WWPNs 1104.

Figure 12:
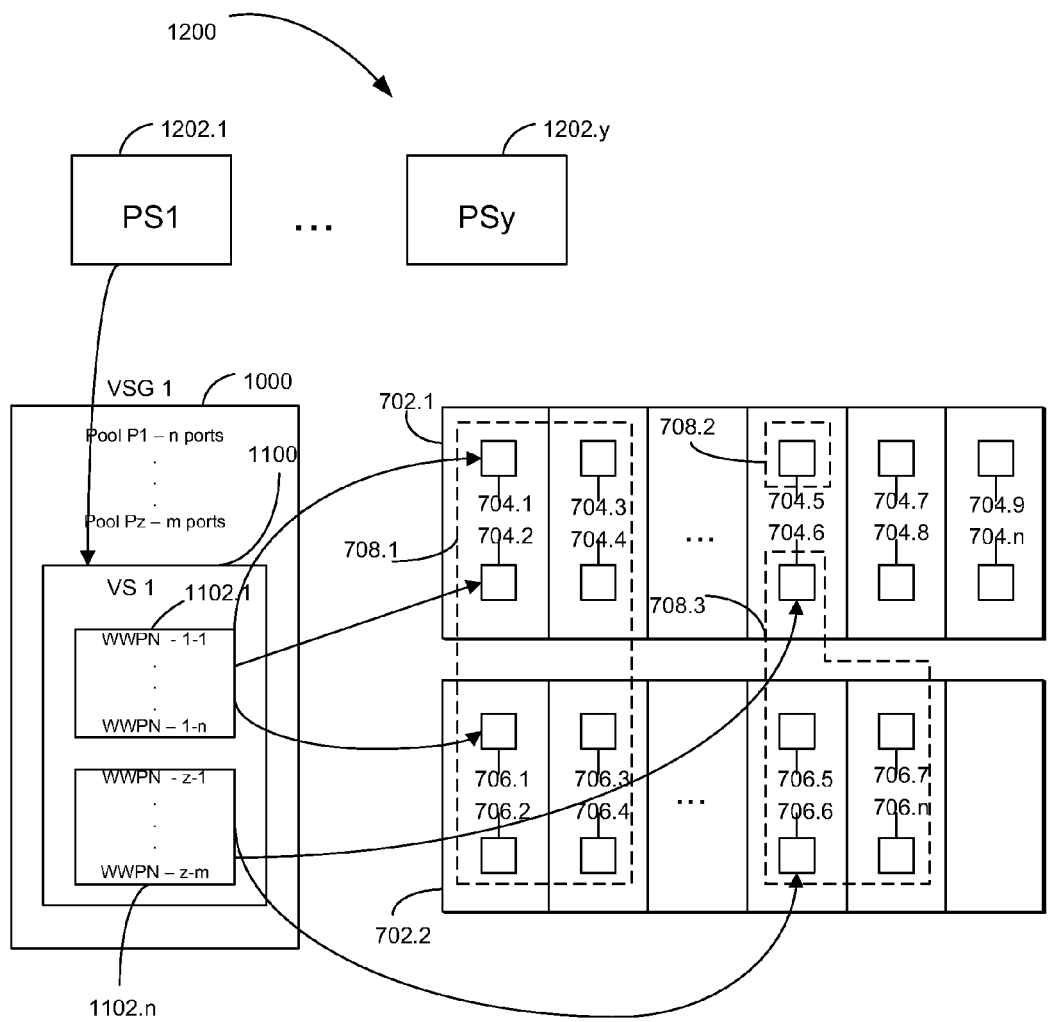
FIG. 12 is a block diagram of a physical server assigned to a virtual server in accordance with an example embodiment.

As illustrated in FIG. 12, an example system 1200 may include a physical server 1201.1 assigned to the virtual server 1102. In an example embodiment, when the physical server 1202 is provisioned and assigned to the virtual server 1102 and gateway ports 704, 706 of the port pools 708.1-708.2 are on the same SAN 710, the gateway ports 704.1-704.$n$, 706.1-706.$n$ may be selected by the VSS director 62 instead of by an administrator of the system 10. For example, the VSS director 62 may select gateway ports 704, 706 from the gateway ports 704.1-704.$n$, 706.1-706.$n$ based on a desired bandwidth and/or other criteria.

In an example embodiment, the one or more port pools 708.1-708.3 may enable the VSS director 62 to assist a user in detecting storage configuration errors. For example, if it was determined that the virtual server 1102 could access a target memory device 716 (see FIG. 7) through one gateway port 704, 706 in a particular port pool 708, but not another gateway port 704, 706 in the same particular port pool 708, then a troubleshooting analysis by the VSS director 62 may suggest that it was a zoning error.

In an example embodiment, an alternative virtualization engine may be used instead of or in addition to the VSS director 62 (see FIG. 1) that may sit at a higher level than the fibre channel gateway 900 and may be able to configure multiple gateways 912.1-912.$n$, 914.1-914.$n$ and multiple gateway device 702.1-702.$n$ (see FIGS. 7 and 9).

Figure 13:
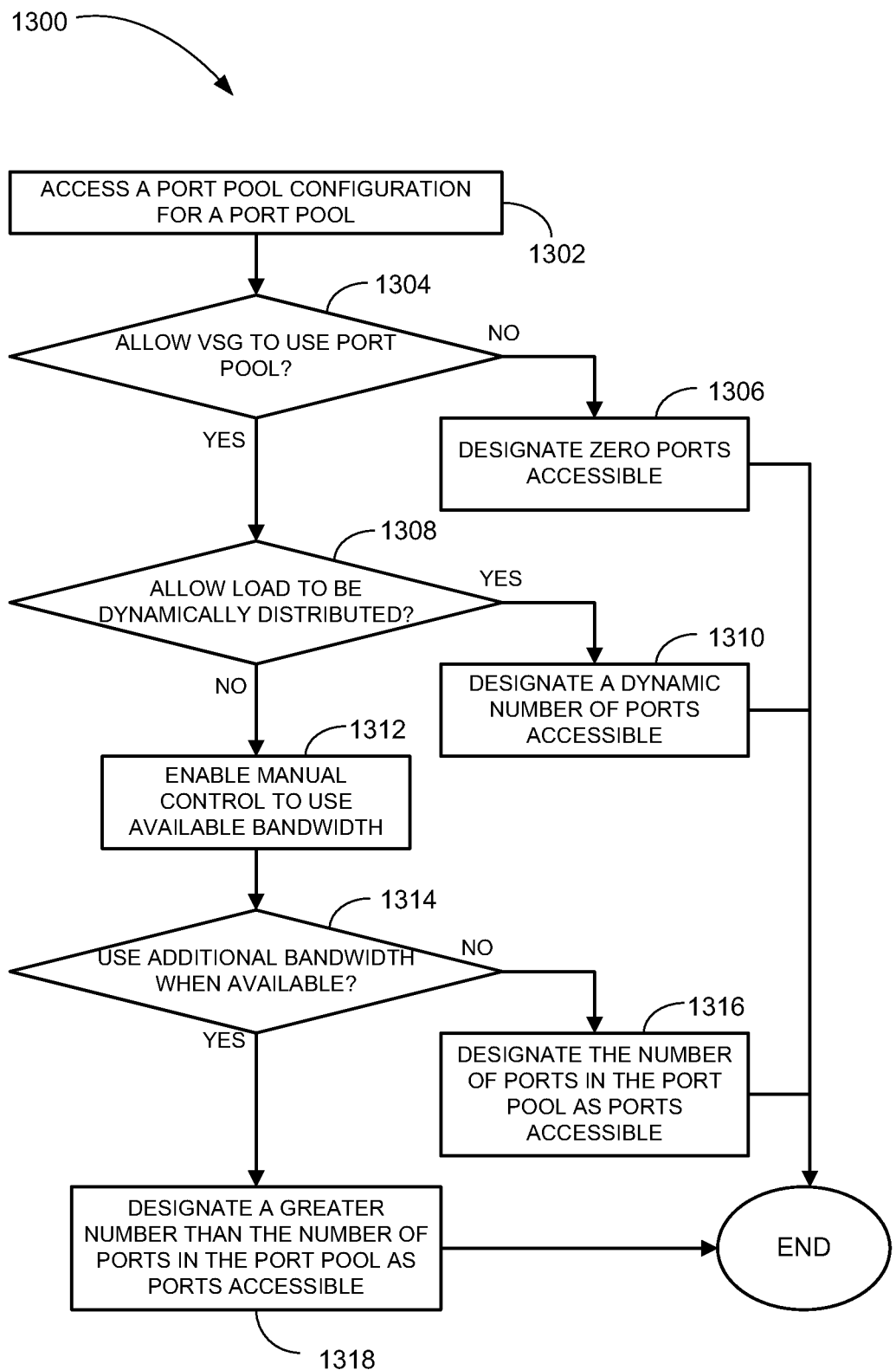
FIG. 13 is a flowchart illustrating a method for designating gateway port availability according to an example embodiment.

FIG. 13 shows a method 1300 for designating gateway port availability according to an example embodiment. In an example embodiment, the method 1300 may be performed during the operations of block 804 (see FIG. 8). For example, the method 1300 may be performed for each port pool 708 of the virtual server group 1000 (see FIGS. 7 and 10).

A port pool configuration may be accessed at block 1302. The port pool configuration may be a desired port pool behavior by an administrator based on a number of gateway ports 704.1-704.$n$, 706.1-706.$n$ made available to a particular virtual server 1102 (see FIG. 11) in the virtual server group 1000.

A determination may be made (e.g., based on the port pool configuration accessed) at decision block 1304 whether to allow the virtual server group 1000 use of a particular port pool 708. If a determination is made not to allow the virtual server group 1000 to use the port pool 708, zero gateway ports 704.1-704.$n$, 706.1-706.$n$ may be designated as being accessible to the virtual server 1102 from the port pool 708. If the determination is made to allow the virtual server group 1000 use of the port pool 708, the method 1300 may proceed to decision block 1308.

At decision block 1308, a determination may be made (e.g., based on the port pool configuration accessed) as to whether a load on the gateway ports 704.1-704.$n$, 706.1-706.$n$ may be distributed (e.g., by the VSS director 62 of FIG. 1) dynamically. If a determination is made to allow the load to be dynamically distributed, a dynamic number of gateway ports 704.1-704.$n$, 706.1-706.$n$ may be designated as being accessible to the virtual server 1102 of the virtual server group at block 1310. For example, the dynamic number of gateway ports 704.1-704.$n$, 706.1-706.$n$ available to the virtual server may be a number greater than zero but less than the total number of all gateway ports 704.1-704.$n$, 706.1-706.$n$ of the particular port pool 708.

If a determination is made not to allow the load to be dynamically distributed, manual control may be enabled to use available bandwidth for the virtual servers 1102 of the virtual server group at block 1312. Upon completion of the operations at block 1312, a determination may be made (e.g., based on the port pool configuration accessed) at decision block 1314 as to whether additional bandwidth (e.g., the addition of a gateway port 704, 706) should be used when available. If a determination is made that the additional bandwidth should not be used when available, the number of gateway ports 704.1-704.$n$, 706.1-706.$n$ in the port pool 708 may be designated as the number of ports accessible to the port pool 708. The use of every one of the gateway ports 704.1-704.$n$, 706.1-706.$n$ may provide the administrator with a maximum amount of control on which of the one of the gateway ports 704.1-704.$n$, 706.1-706.$n$ the virtual server 1102 of the virtual server group 1000 may use.

If a determination is made to use the additional bandwidth when available at decision block 1314, a greater number than the number of gateway ports 704.1-704.$n$, 706.1-706.$n$ in the port pool 708 may be designated as the number of ports accessible to the port pool 708 for use by the virtual server 1102 of the virtual server group 1000 at block 1318. For example, if an additional gateway port 704, 706 is added to the port pool, the virtual server 1102 may then use the additional gateway port 704, 706 for greater bandwidth.

Upon completion of the operations at block 1306, 1310, 1316, or block 1318, the method 1300 may terminate.

By way of an example, if a port pool 708 has only two gateway ports 704, 706 but the user wants to provide for future growth, the user may provide a virtual server 1102 access to four gateway ports 704, 706 in the port pool 708 even though there are currently only two gateway ports 704, 706 in the port pool 708. When two more gateway ports 704, 706 are added later, the new gateway ports 704, 706 may automatically be used (e.g., by VSS director 62).

In an example embodiment, the VSS director 62 may make an allocation decision based on a particular selection of gateway ports 704, 706 from the gateway ports 704.1-704.$n$ 706.1-706.8 that are in a particular port pool 708, then seek to first spread the particular selection of gateway ports 704, 706 across the one or more gateway device 702.1-702.2 and then spread across the one or more gateways 812.1-812.$n$, 814.1-814.4. In an example embodiment, the gateway ports 704, 706 may be selected for high availability and/or load balancing.

When the VSS director 62 has a port pool 708 with multiple available gateway ports 704.1-704.$n$, 706.1-706.$n$, the VSS director 62 may balance an assignment of the multiple available gateway ports 704, 706 for the virtual server 1102 by selecting a first gateway port 704 from a first gateway device 702.1 and a second gateway port 706 from a second gateway device 702.2. By selecting multiple gateway devices 702 for the plurality of gateway ports 704.1-704.n, 706.1-706.n, if one of the gateway devices 702 fails, the virtual server 1102 may still have access to another gateway device 702, thereby providing high availability of the virtual server system 10. For example, a user may define one or more allocation policies and control how the gateway ports 704.1-704.n, 706.1-706.n are allocated using the one or more allocation policies.

During unavailability of a gateway port 704, 706, the VSS director 62 may assign a new gateway port 704, 706 from the same port pool 708 of the port pools 708.1-708.3 when available. For example, a selection of the gateway ports 704.1-704.n, 706.1-706.n may differ each time a virtual server 1102 is provisioned based on available of the gateway ports 704.1-704.n, 706.1-706.n to a port pool 708.

Figure 14:
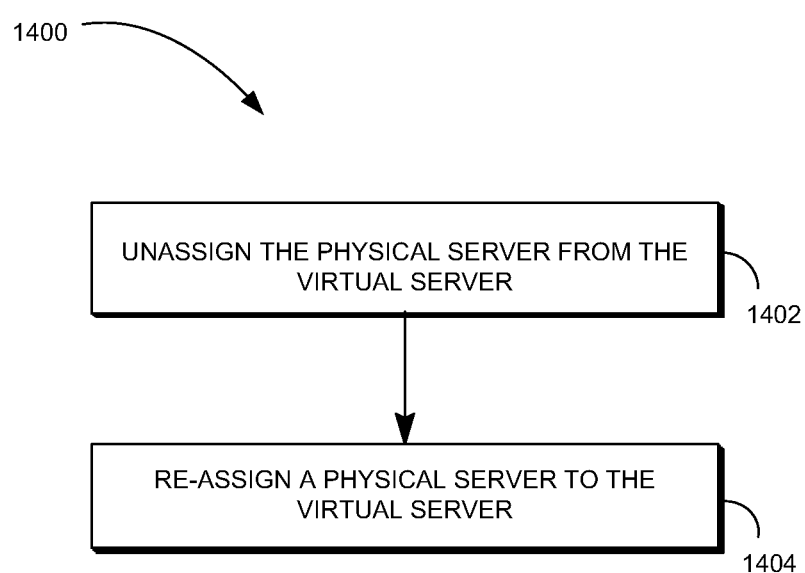
FIG. 14 is a flowchart illustrating a method for reassigning a virtual server in accordance with an example embodiment.

FIG. 14 illustrates a method 1400 for reassigning a virtual server 1102 (see FIG. 11) in accordance with an example embodiment. For example, the virtual server 1102 may be reassigned after completing the operations at block 808 (see FIG. 8).

The physical server 1202 (see FIG. 12) may be unassigned from the virtual server 1102 at block 1402. For example, the VSS director 62 (see FIG. 1) may shut down the virtual server 1102 and unbind the WWPNs 1104 (see FIG. 11) of the virtual server 1102 from the gateway ports 704.1-704.n, 706.1-706.n such that the virtual server 1102 may no longer consumes resources on the fibre channel gateway 900 (see FIG. 9).

The physical server 1202 may be reassigned to the virtual server 1102 at block 1404. For example, block 1404 may include the operations at block 808 (see FIG. 8). In an example embodiment, conditions of the system 10 may be different such the WWPNs 1104 may be bound to different gateway ports 704.1-704.n, 706.1-706.n.

Upon completion of the operations at block 1404, the method 1400 may terminate.

Figure 15:
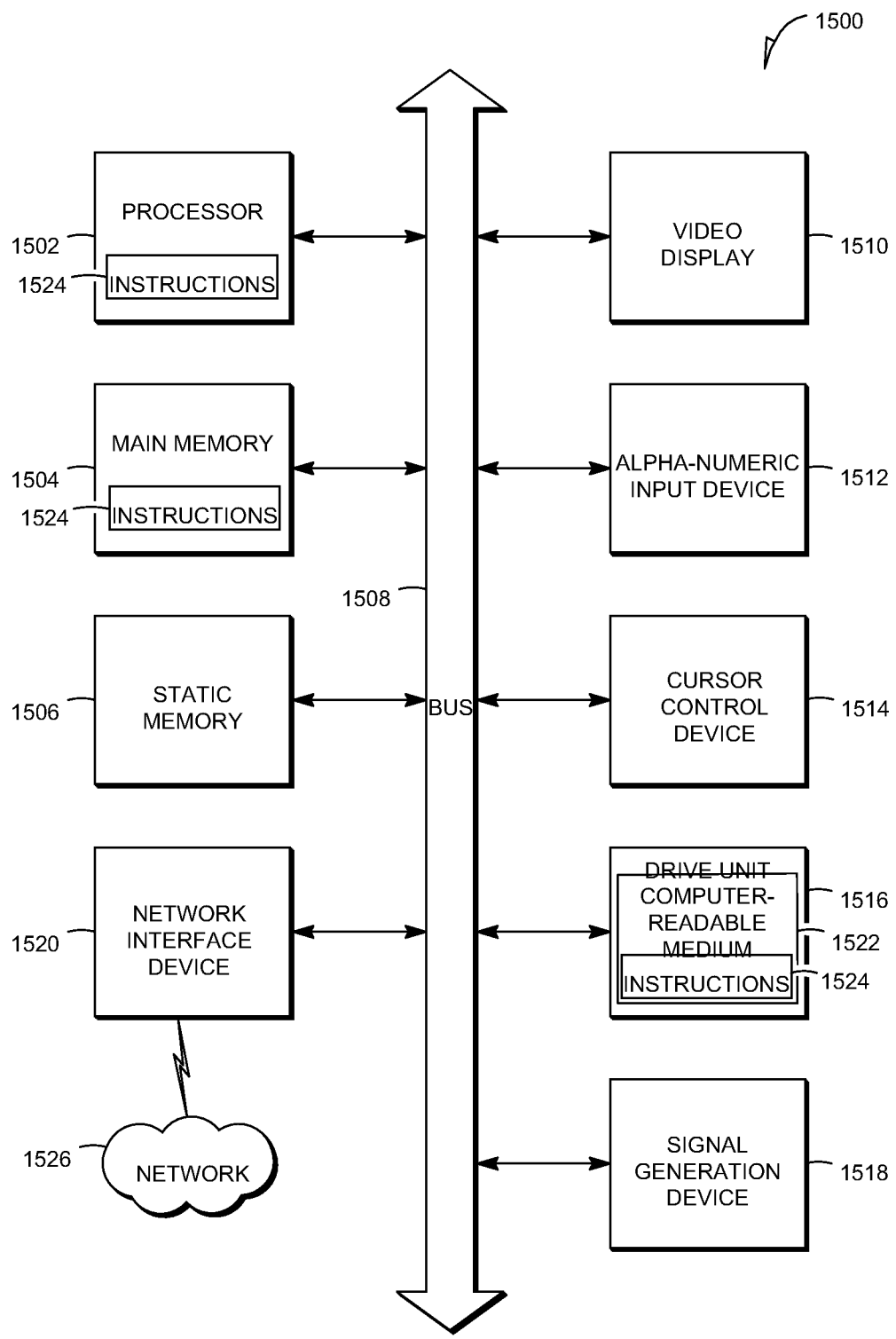
FIG. 15 shows a diagrammatic representation of machine in the example form of a computer system within which a set of instructions, for causing the machine to perform any one or more of the methodologies discussed herein, may be executed.

FIG. 15 shows a diagrammatic representation of machine in the example form of a computer system 1500 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or as a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU) a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions (e.g., software 1524) embodying any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

The software 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although example embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising:
   a processor-implemented interface to communicate with a physical server, the physical server hosting a plurality of virtual servers and being connectable via a plurality of gateway ports to a storage area network (SAN); and
   a virtual server manager configured to allow a third party management tool to:
   group the plurality of gateway ports into a plurality of port pools;
   generate a pool listing indicating a specific number of the gateway ports in each of the plurality of port pools that are available for access by the plurality of virtual servers;
   associate each virtual server from the plurality of virtual servers with the specific number of the gateway ports in each of the plurality of port pools, based on the pool listing; and
   transmit a configuration instruction that allows the each virtual server to communicate with the SAN through the gateway ports associated with the respective virtual server.

2. The apparatus of claim 1, wherein the virtual server manager is further configured to:
   detect a storage configuration error.

3. The apparatus of claim 1, wherein the virtual server manager is further configured to:
   balance a load across the plurality of available gateway ports of the plurality of port pools, the balancing based on available bandwidth.

4. The apparatus of claim 1, wherein the virtual server manager is further configured to:
define an allocation policy, defining an allocation of the plurality of available gateway ports to the plurality of port pools; and
provide the plurality of virtual servers with access to the plurality of allocated available gateway ports based on the allocation policy.

5. The apparatus of claim 1, wherein the virtual server manager is further configured to:
transmit a configuration instruction that allows the each virtual server to communicate with the SAN through a subset of the plurality of available gateway ports.

6. The apparatus of claim 1, wherein the virtual server manager is further configured to:
unassign the physical server from a virtual server; and
reassign a Previously Presented physical server to the virtual server, the virtual server being associated with a different subset of the plurality of available gateway ports.

7. The apparatus of claim 1, wherein the virtual server manager is further configured to:
migrate a virtual server from a first gateway port to a second gateway port in a same port pool from the plurality of port pools.

8. The apparatus of claim 1, wherein the virtual server manager is further configured to:
generate a World-Wide Node Name (WWNN) for the each virtual server from the plurality of virtual servers.

9. The apparatus of claim 8, wherein the virtual server manager is further configured to:
generate a World-Wide Port Name (WWPN) associated with the WWNN;
bind the WWPN to a port pool from the plurality of port pools; and
assign the WWPN for the each virtual server associated with the port pool.

10. A method comprising:
grouping a plurality of gateway ports into a plurality of port pools, the plurality of gateway ports configured to connect a physical server to a Storage Area Network (SAN);
grouping a plurality of virtual servers into a virtual server group, the virtual servers being hosted on the physical server;
generating a pool listing indicating a specific number of the gateway ports in each of the plurality of port pools that are available for access by the plurality of virtual servers;
associating each virtual server from the plurality of virtual servers with the specific number of the gateway ports in each of the plurality of port pools, based on the pool listing;
transmitting a configuration instruction that allows the each virtual server to communicate with the SAN through the gateway ports associated with the respective virtual server; and
detecting a storage configuration error based on the plurality of port pools.

11. The method of claim 10, wherein the method is performed by a third party management tool through a virtual server manager.

12. The method of claim 10, further comprising:
balancing a load across the plurality of available gateway ports of the plurality of port pools, the balancing based on available bandwidth.

13. The method of claim 10, further comprising:
defining an allocation policy, defining an allocation of the plurality of available gateway ports to the plurality of port pools; and
providing the plurality of virtual servers with access to the plurality of allocated available gateway ports based on the allocation policy.

14. The method of claim 10, further comprising:
transmitting a configuration instruction that allows the each virtual server to communicate with the SAN through a subset of the plurality of available gateway ports.

15. The method of claim 10, further comprising:
unassigning the physical server from a virtual server; and
reassigning a physical server to the virtual server, the virtual server being associated with a different subset of the plurality of available gateway ports.

16. The method of claim 10, further comprising:
migrating a virtual server from a first gateway port to a second gateway port in a same port pool from the plurality of port pools.

17. The method of claim 10, further comprising:
generating a World-Wide Node Name (WWNN) for each virtual server the plurality of virtual servers.

18. The method of claim 17, further comprising:
generating a World-Wide Port Name (WWPN) associated with the WWNN;
binding the WWPN to a port pool from the plurality of port pools; and
assigning the WWPN thr the each virtual server associated with the port pool.

19. A non-transitory machine-readable storage medium storing a set of instructions which, when executed by a machine, causes the machine to:
group a plurality of gateway ports into a plurality of port pools, the plurality of gateway ports configured to connect a physical server to a Storage Area Network (SAN);
group a plurality of virtual servers into a virtual server group, the virtual servers being hosted on the physical server;
generate a pool listing indicating a specific number of the gateway ports in each of the plurality of port pools that are available for access by the plurality of virtual servers;
associate each virtual server from the plurality of virtual servers the specific number of the gateway ports in each of the plurality of port pools, based on the pool listing;
transmit a configuration instruction that allows the each virtual server to communicate with the SAN through the gateway ports associated with the respective virtual server; and
detect a storage configuration error based on the plurality of port pools.

* * * * *